April 7, 1970  A. J. WERNER  3,505,606
PLURAL MODE PROCESS CONTROLLER
Filed Oct. 6, 1966  2 Sheets-Sheet 2
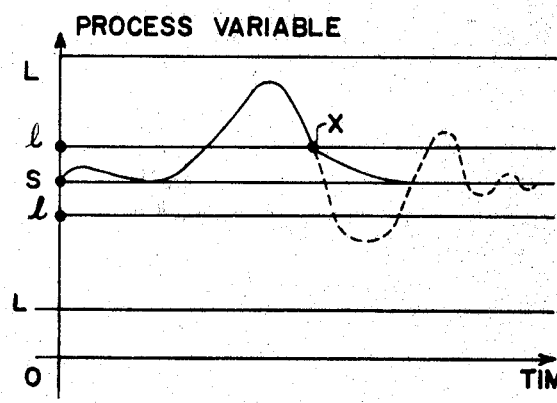
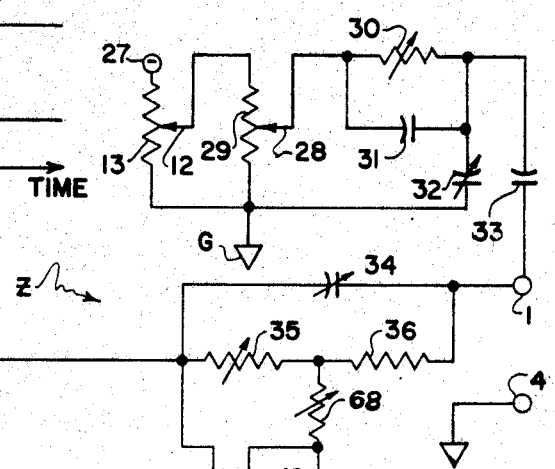
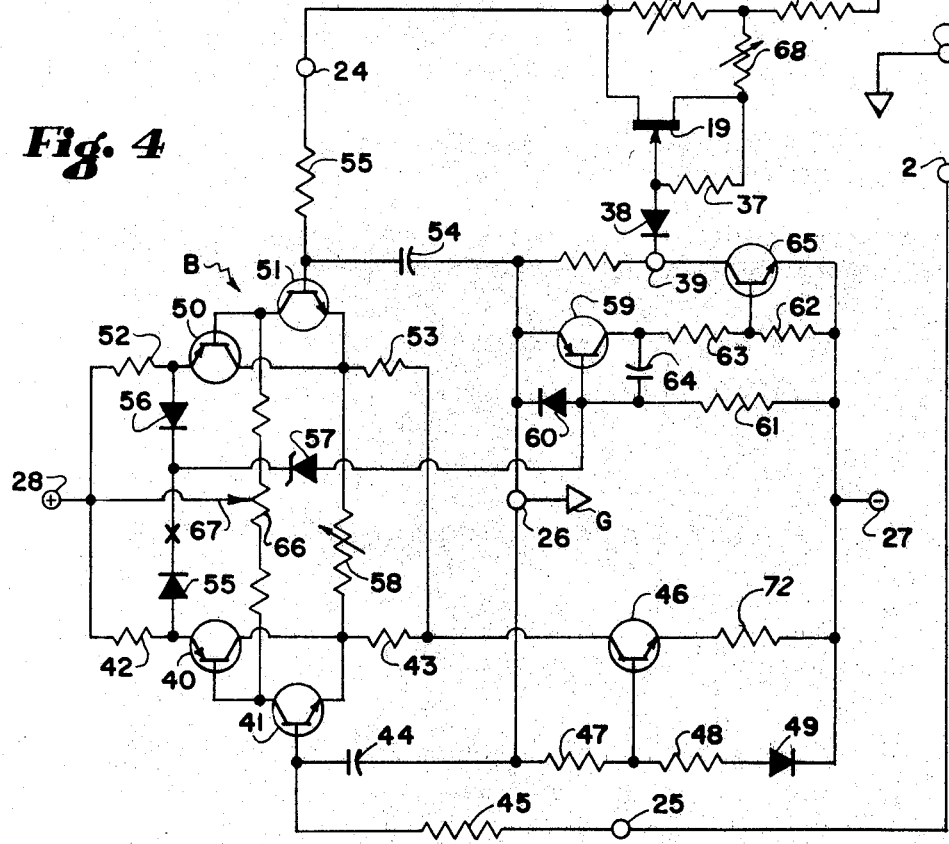

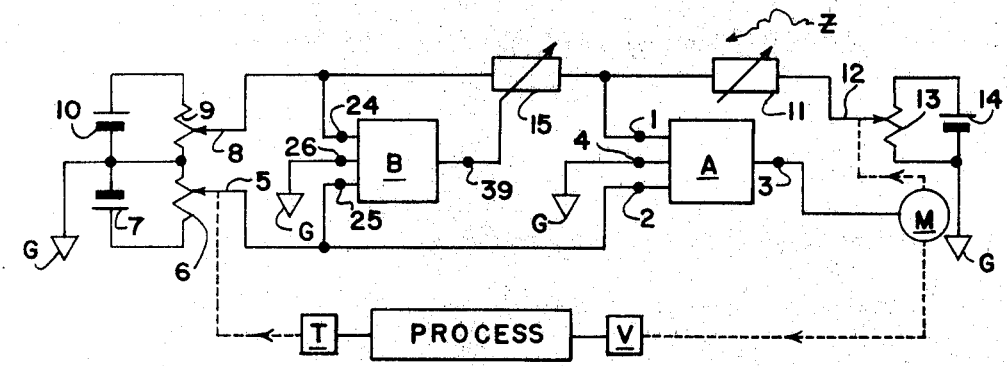
Fig. 1
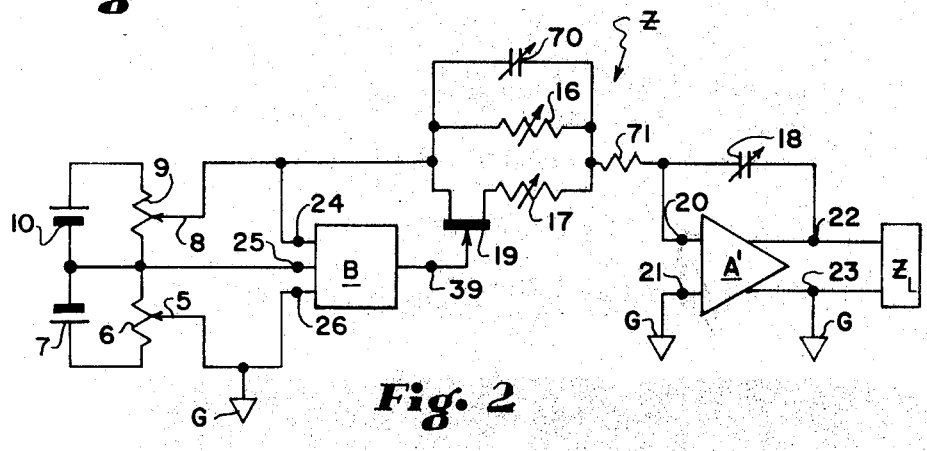
Fig. 2
Fig. 5
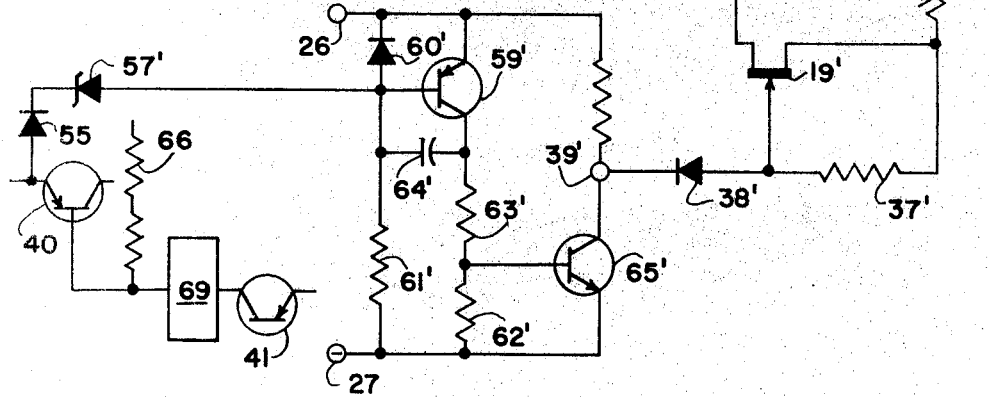

United States Patent Office 3,505,606
Patented Apr. 7, 1970

3,505,606
PLURAL MODE PROCESS CONTROLLER
Alan J. Werner, Brighton, N.Y., assignor to Sybron
Corporation, a corporation of New York
Filed Oct. 6, 1966, Ser. No. 584,875
Int. Cl. G06g 7/18
U.S. Cl. 328—146                                    10 Claims

ABSTRACT OF THE DISCLOSURE

A process controller having several modes of unsaturated operation, and including an amplifier having an input and feedback circuitry to define controller output. The controller includes circuitry for determining when process variable deviation exceeds a predetermined absolute value, and for modifying the input circuitry when this value is exceeded. This modification increases controller gain, and persists until the process variable deviation becomes less than said value again. As shown, the modification is switching resistance in the input circuit, such as to provide the controller with larger reset effect for large process variable deviations than for small process variable deviations.

---

This invention relates to process controllers for controlling a process variable in response to departure thereof from some desired state or magnitude. Typically, such a controller is a device that generates a control signal that acts in some way on the process variable to reduce such departure to zero, or to cause the process variable to assume the desired state. Such control signal is generated from an error signal representative of the departure, and is applied to a process control valve or like device forming part of the process environment, say to vary admission to or exhaust of fluid from said environment in such a way as to influence the process variable to approach or maintain the desired state or magnitude.

In some cases, the control signal may at any instant bear a proportional relation to the magnitude of the error signal at that instant. In other cases, control signal may be the time integral of said error signal, the time derivative thereof, and/or the like.

The general object of the invention is to provide a novel process controller of the type described having plural unsaturated modes of operation.

In particular, it is an object of the invention to provide a novel process controller of the type described, which is responsive to process deviation to provide one or another unsaturated mode of operation, depending on the character of the process deviation.

Other objects of the invention will become evident from the description and claims to follow, hereinbelow.

Generally speaking, controllers have two modes of operation: saturated and unsaturated. In the saturated mode, the controller is exerting the maximum control on the process under control. In the unsaturated mode, the controller is exerting a control effect that varies more or less continuously with the need for control effect. While controllers designed for unsaturated mode operation are in general inherently capable of saturated mode operation, normally the controller is used in such a way as to prevent, insofar as possible, occasion arising for saturated operation. Indeed, in this sort of controller, saturated mode operation is more an inconvenience than anything else. For example, in so-called reset controllers, saturation leads to "reset wind-up" unless certain expedients are adopted to prevent wind-up, as for example, in the controller disclosed and claimed in U.S. Patent No. 3,127,105 to Nathaniel B. Nichols, granted Mar. 31, 1964, and assigned to the assignee of the present invention.

A controller according to the present invention is in the same class as the Nichols controller, in particular, its operation is describable in terms of continuous linear integro-differential equations, and like the Nichols controller, may be provided with an anti-reset wind-up feature, in order to make the best of saturated mode operation. In addition, however, a controller according to the present invention provides a plurality of unsaturated modes of operation. The controller is in one unsaturated mode or another, depending on the magnitude of the process error signal, i.e., difference between the desired value of the process variable, or set point, and the actual value thereof.

These unsaturated modes are describable by continuous, linear, integro-differential equations, and by modifying the variables of a given equation, and/or the coefficient of a variable thereof, a different mode of operation results. In the ordinary case, the controller is tuned to the process by choice of a certain equation with fixed values of the coefficients of its terms. Very often, these fixed values must be chosen so that good control is had for a certain domain of unsaturated operation but relatively poor control for another domain of unsaturated operation. Again, the fixed values may be chosen so that over both domains of unsaturated operation, a compromise of good and poor control is had.

For example, consider a heating process wherein in a valve controls the flow of steam through heating coils immersed in a body of fluid, and wherein a controller is provided to maintain the body of fluid at a desired temperature. Thus, the controller senses the difference between the actual temperature of the body of fluid and the desired temperature. In this sort of process, if the temperature does not change quickly, it is obvious that the extent the valve has to be open does not change very much. Experience has shown that in this condition of the process, the controller should not change valve opening too considerably for a small change in process temperature, but it should sustain the changes for relatively long times.

The process temperature may change quite drastically, however, say due to a large quantity of heated fluid being drawn off and replaced by a like quantity of cold fluid. When the process is in this condition, it is likely that the temperature deviation is of the sort that in the main is most efficiently reduced by a large change in valve opening of relatively short duration. The controller, however, will now be found to provide a lesser change in valve opening than desirable, and one of relatively long duration. Consequently, the controller takes longer to restore the temperature to set point than it would if it were adjusted for efficien reduction of large temperature deviations.

The foregoing assumes that the demand for control effect does not saturate the system, e.g., call for the valve to open 100% or more. It is evident that in the range of unsaturated operation there is a range of relatively small temperature deviations which the controller should act in in accordance with one control equation, as well as a range of relatively large deviations on which the controller should in accordance with a modified version of such equation, or even one of a different kind (each equation, in any case, being a continuous, linear integro-differential equation). Further, it is evident that there may be more than two ranges of deviation, each calling for a different regime or mode of unsaturated controller operation.

The main object of the present invention is to provide a novel form of controller having plural modes of unsaturated operation. Other more specific objects will be evident from the description and claims to follow.

In the drawing:
FIGURE 1 is a block diagram of one form of a plural mode controller in accordance with the invention;

FIGURE 2 is a diagram, including certain circuit details, of an electrical form of a plural mode controller according to the invention;

FIGURE 3 is a diagram illustrating the principles of the invention in geometrical form;

FIGURE 4 illustrates detail of a specific example of the invention; and

FIGURE 5 shows a modification thereof.

FIGURE 1 illustrates a position actuated type of controlling apparatus, of for the most part conventional form, forming part of a system including a process denoted by the box marked PROCESS and on which control effect is exerted by a control element V, say a valve as described above. The valve V is driven by a reversible electrical motor device M under control of a differential relay A. The relay is constructed and arranged to receive suitable signals at inputs 1 and 2, and to produce a motor control signal at its output 3. The control signal drives motor M in one sense or another, depending on which input signal is the larger, the motor, in turn, correspondingly increasing or decreasing the extent to which valve V is open. The relay A has a deadband, that is, for a predetermined sufficiently small magnitude of difference between input signals, it produces no signal at all, at which time the motor does not drive and valve V remains open in the amount to which motor operation last drove it, until such time as the input signal difference becomes larger than said predetermined sufficiently small magnitude.

A process variable transmitter T is arranged to measure the temperature or other process variable under control in PROCESS and to transmit a corresponding signal to the controller. For illustration purposes only, the transmitter is shown as moving the slider 5 of a rheostat 6 across which is connected a source of D.C. voltage 7, the arrangement being that the position of slider 5 is representative of the magnitude of the process variable at substantially any given instant.

A similar slider 8, rheostat 9 and D.C. source 10 is also provided, slider 8 being, say, manually set to positions representative of the desired value of the process variable, i.e., the set point. The sliders 5 and 8 are ultimate source of the signals applied to inputs 1 and 2 of relay device A, and, as shown, sources 7 and 10 have common like terminals. Accordingly, the difference between the slider voltage is proportional in magnitude, and corresponds in sense, to the deviation of the process variable from the set point.

Ignoring for the moment the variable impedances collectively denoted by reference charater Z, it will be evident that reversing the sense of a difference between the slider voltages reverses the sense of operation motor M, the arrangement chosen being that a given sense of voltage difference causes the motor to change valve opening in such sense as to reduce that voltage difference to a value within the deadband of device A.

Preferably, device A is such that its unmodified motor control output signal would drive motor M at maximum speed, which would provide a saturated mode of control.

The impedances Z, however, provide unsaturated modes, impedance 11 being connected to slider 12 of a rheostat 13 across which is connected D.C. voltage source 14, and the slider 12 being driven by motor M. The drive for slider 12 is so arranged that the voltage at slider 12 changes in such a way as to modify the voltage at input 1 of device A in such a way as to eventually turn the device A off, i.e., stop the motor or even reverse it, causing slider voltage change to reverse direction. From the figure, it will be seen that the signal at input 1 is the difference between the voltage at slider 8 modified by an impedance 15, and the voltage at slider 12, modified by impedance 11.

Impedances Z may be various RLC combinations, but typically involve resistance and capacitance, which attenuate and/or delay voltage changes at input 1 so that the relation of relay input to valve opening is some continuous, linear integro-differential equation of the sort exemplified in the above-cited Nichols patent. The terms of the equation depend on the circuit arrangement of impedances Z, and the values of the impedances appear as numerical coefficients of such terms.

The foregoing is well understood in the art. The gist of the invention resides in providing for variation or modification of one or another of impedances Z in response to deviation of the process variable from the set point. For example, the differential relay B is provided which senses the difference between the voltages at sliders 5 and 8, and, when such difference exceeds a certain absolute magnitude, modifies or varies impedance 15. Thus, impedance 15 has a given value or nature as long as said difference is in a range corresponding to said absolute value, and is so calculated as to provide the unsaturated mode of control of valve V best suited to reduce such difference to substantially zero. The absolute value, in turn is so chosen that if such difference exceeds it in magnitude, said given nature or value of impedance 15 no longer provides the best unsaturated mode of control, whereas change or modification thereof, due to operation of relay B, does cause it to provide the best mode of control.

The above-described absolute value need not be symmetrical with respect to zero difference in slider voltage, for in some processes a larger deviation from set point in one sense may be permitted before modifying the control equation, than in the case of a deviation in the opposite sense. Again, it is possible that there may be a second, larger absolute value of deviation that may require a second modification or change in one or another of impedances Z.

In FIGURE 2, the invention is illustrated in connection with a particular form of controller, namely, a proportional plus reset controller. As like reference numerals denote like parts already described in connection with FIGURE 1, such parts will not be re-described in connection with FIGURE 2.

In FIGURE 2, the impedances Z are shown as resistor 71, variable resistors 16 and 17, variable capacitors 18 and 70 and what amounts to a switch: a field effect transistor (FET) 19 with its gate connected to be controlled by the output of relay B. While the remainder of the system could be as shown in FIGURE 1, for the sake of variety, the relay A has been replaced by the high gain amplifier A having input terminals 20 and 21, and output terminals 22 and 23 across which a load $Z_L$ is connected, load $Z_L$ representing the impedance of control element which exerts its control effect in accordance with the load current through $Z_L$, feedback being taken via capacitor 18 from the output terminal 22. As shown, relay A' and the impedances Z form an operational amplifier type controller of the type described in the above-cited Nichols patent.

Since FET is effectively an infinite impedance in series with resistor 17, unless its gate is turned on, when the gate is off the time rate of variation of the current through $Z_L$ is a function of resistance 16 and capacitor 18, proportioning and integrating effects being created thereby in dependence on the values of capacitor 18 and resistor 18. Commonly, resistor 18 is set to a relatively large value, megohms, typically, which essentially measures reset or integrating action, and provides such integrating action as is necessary to maintain the process variable accurately at set point, as long as deviations from the set point are not too large.

Relay B is set to turn FET 19 on when deviation from set point reaches such value as would require excessively long time for reduction by small-deviation-suited proportional plus reset action. When FET 19 is on, resistor 17, which is relatively low in resistance, say of the order of one-tenth that of resistance 16, and also small compared to resistor 71, reset action will be drastically speeded up, and, indeed, the overall gain of the controller will be increased thereby so that the quantity of control effect delivered to the process per unit time will be greater than had the FET not become conductive. Consequently, something of the immediate effectiveness of a saturated mode of control is obtained. However, this takes place before anything in the system saturates, and the process remains under control. One of the characteristics of saturated mode is that the process is at best only marginally under control, that is to say, it is calling for the utmost that can be delivered in control effect, or more. If the latter, the demand for control is not being satisfied, and the process is on its own, so to speak, and will not be under control again until and unless the controller finally manages to deliver enough control effect and/or the process comes under some other influence, independent of the controller, that reduces the deviation to controllable bounds.

Providing the FET controlled modes of unsaturated control for large deviations has several advantages, in addition to that already mentioned. Among other things, it tends to prevent large process deviations from becoming large enough to drive the system into a saturated mode. Again, the two unsaturated modes cooperate to transform the high gain mode (FET 19 on) to one that is optimum both as to accuracy and speed. Thus, high proportional gain control involves a certain amount of overcorrection. That is the first attempt of the controller to reduce a deviation not only reduces the deviation, but also produces a deviation in the opposite sense, and several such deviations and reversals must occur at best. However, the first such attempt in a high gain mode in the system of FIGURE 2, brings the deviation into the small-value region thereof in which the FET is turned off by relay B, and the controller reverts to its original mode, which ordinarily can, and is, adjusted to provide deadbeat control, that is, small deviations reduce at a rate such that the process variable attains the set point asymptotically.

FIGURE 3 graphically illustrates the above. On the graph, ordinate being process variable magnitude, and abscissa being real time, point S represents set point. Points *l* represent the limits of the normal proportional plus reset mode. Points L represent the limits within which unsaturated modes of control can occur. The solid curve shows the course of the process variable for a given time during the life of the process. In the beginning, the process variable does not deviate past a limit *l*, hence, it returns to the set point smoothly and substantially without any oscillation about the control point.

Next, the process variable (say, due to some external disturbance independent of the controller), has gone beyond a limit *l*, without, however, exceeding a limit L, and control action changes and quickly reverses the direction of the process variable. When the control action has driven the process variable back across the limit *l*, it reverts to its previous nature and the process variable comes into the set point deadbeat, so to speak. If the control action mode beyond the limit *l* persisted when the process variable came within limits *l*, the process variable would have taken a course indicated by the dashed-line continuation of the process variable curve.

In FIGURE 4, a specific form of circuitry incorporating impedances Z and relay B is shown in detail, and in such form as it would take in connection with a system of FIGURE 1 type, but being readily adaptable to a system of FIGURE 2 type, since the difference between the two types of systems is in the source of feedback signal. That is to say, in FIGURE 1, feedback from terminal 3 undergoes an electric to mechanical to electric conversion in going to impedance 11, because part of the valve drive (motor M) is in the loop. In a FIGURE 2 system, however, the valve drive is outside the corresponding loop. Functionally, both cases are the same, namely, what is done to the valve is fed back via Z, and what the valve does to the process is fed back via transmitter T, in each case.

In any event, relay B takes the form of a transistorized, amplifying circuit having the several terminals 24, 25 and 26, the location of these terminals being also shown in FIGURES 1 and 2 to orient the circuit to these latter figures. Likewise, terminals 1, 2 and 4 and certain other elements of FIGURES 1 and 2 are reproduced in FIGURE 3.

Supply voltage terminals 27 and 28 are provided for powering the circuit in the usual manner; by respective neagtive and positive D.C. voltages. Terminal 26 represents zero volts and circuit common for the entire system, as is indicated by the use of the usual inverted triangle symbol at various places in the figures denoted by the reference character G. It will be noted that connection of rheostat 13 to terminal 27 and circuit common provide the D.C. source 14 of FIGURE 1.

Impedances Z consisting of resistance and capacitance are connected in a network providing proportional, reset and rate actions, each individually adjustable. Thus, a slider 28 of a rheostat 28 connected between circuit common and slider 13 provides for setting what proportion of the voltage at slider shall be fed back to terminal 1 of relay A. Again, a series-parallel RC network comprising variable resistor 30, capacitor 31 and variable capacitance 32 provides adjustable rate action. That is to say, the rate circuitry provides for delaying feedback of change in voltage at slider 28 (due to position change of slider 12) to terminal 1, and adjustment of its components provides for adjustment of the rate action.

Capacitor 33 corresponds roughly to capacitor 18 of FIGURE 2, but is not adjustable, since such adjustments as are needed, are provided for by other of impedances Z.

Reset action is provided by adjustable capacitance 34, adjustable resistance 35 and resistor 36, when FET 19 is in a nonconductive state. These impedances delay the application of the signal changes at terminal 24 to the terminal 1, and the delay is adjusted by means of capacitor 34 and/or resistance 35. When FET 19 conducts, the contribution of resistance 35 is substantially nil, since it is then practically shorted out by FET 19.

In the FIGURE 4 system, feedback strives to bring terminal 1 to the same voltage as terminal 2, so as to turn off relay A and stop motor M (in practice, it is arranged that the relay turns off whenever the voltages differ by an amount sufficient to assure that the relay A does not hunt). Hence, terminal 1 tends to have a fixed negative voltage, changes in voltage at terminal 24 eliciting opposing changes at slider 12. The reset and rate circuitry respectively determine the time which voltage change terminal 24 keeps the relay on and the time at which voltage change at slider 12 turns it off. Thus, delay due to reset circuitry means that the feedback will turn the relay off a number of times for a change in voltage at slider 24. The longer the duration of the last said change, and the shorter the time constant of the reset action, the more frequently the relay A turns on and off.

Again, the longer the time constant of the rate action, the longer the relay A will stay on after being turned on by change in voltage at terminal 24.

The setting of slider 28 controls the general level of gain after feedback, and in general, the larger the proportion of voltage of rheostat 13, tapped off by slider 28, the smaller is the voltage at terminal 27 needed to turn the relay A on (or off, as the case may be).

The system of FIGURE 2, equipped with circuitry like FIGURE 4 would behave the same. In this case, however, the voltage across rheostat 29 would, in effect, be a drop due to load current output from amplifier A', hence, the system would act to keep substantially zero voltage at terminal 20, and to maintain a load current proportional to the difference between the voltages at sliders 8 and 5.

Turning to relay B, transistors 40 and 41, and resistors 42 and 43 are connected as a reverse-acting high current gain amplifier. Capacitor 44 and resistor 45 provide a low pass filter for preventing unwanted transients from turning the relay B on.

Transistors 50 and 51, and resistors 42 and 43 are connected as a like amplifier, and capacitor 54 and resistor 55 provide a like low pass filter.

A transistor 46 provides a constant emitter current due to its base voltage being held constant by resistors 47 and 48, and diode 49.

The emitter current of transistor 46 passes through resistor 72 and is equal to the sum of the currents through resistors 43 and 53. If the base voltage of transistor 51 increases, the voltage at the emitter of transistor 50 decreases, and current through resistor 43 decreases, and consequently current through resistor 53 increases. Conversely, if base voltage of transistor 51 decreases, current through resistor 53 increases. If the base voltage of transistor 41 increases, the voltage at the emitter of transistor 40 decreases, whereas if the former voltage decreases, the latter voltage increases, as in the case of the amplifier including transistors 50 and 51.

Therefore, the voltages at the anodes of diodes 55 and 56, which are connected to the emitters of transistors 40 and 50, respectively, remain equal as long as the base voltages of these transistors are equal, and the voltage at the junction of the diodes' cathodes is a minimum. However, if either base voltage becomes the higher, the last said voltage increases, which is applied to the Zener diode, and the smaller the value of adjustable resistor 58 the sharper said last said voltage rises, as the gain of the two amplifiers is proportional to the value to which resistor 58 is set.

The foregoing is a typical known differential amplifier arrangement which, by reason of the connection of diodes 55 and 56, produces an output whose sense is independent of the sense of the difference between the voltages at terminals 24 and 25, i.e., represents the absolute value of such difference.

The output of the differential amplifier is used to fire a Zener diode 57 whose cathode is connected to the cathodes of diodes 55 and 56. A circuit including transistors 59 and 65 serves to hold the anode of diode 57 at a small negative value, when diode 57 is in a non-conducting state, and, simultaneously to negatively bias the gate of FET 19 to about the voltage at terminal 27. This comes about as the transistor 59 is biased by resistor 61 into heavy conduction. In a similar fashion, transistor 65 is likewise clamped into a heavily conducting state by a resistor 63. In this condition, terminal 39 is at about the voltage of terminal 27, and therefore FET 19 is in its off condition, making the input resistance to terminal the parallel combination of capacitor 34 with the series resistance of resistors 35 and 36.

However, when diode 57 conducts, a positive voltage is applied to the base of transistor 59, and it stops conducting and its collector voltage goes to about the voltage of terminal 27. As there is then no current through resistor 63, the base of transistor 65 becomes negatively-biased, a process which is helped by the return to terminal 27 via resistor 62. It will be noted that transistors 59 and 65 are of opposite conductivity types so that the former turns off under positive base-bias, whereas the latter turns off under negative base-bias.

Since transistor 65 is now off, the terminal 39 is in effect turned to zero volts (that is, circuit common) as is the gate of FET 19 (via diode 38) which turns on and shunts resistor 35 with its now very low resistance, typically about one-hundredth that of resistor 36. Now the control system begins to operate in one of the regions between 1 and L, as described previously.

The function of capacitor 64 is to provide, with resistance 61, a low pass filter. By returning the capacitor to the collector of transistor 59, instead of to circuit common, the capacitance value of the capacitor is multiplied, due to the well-know "Miller effect," so that the filter effect obtained in that of a rather larger capacitor returned to circuit common. Resistance 37 provides a path that prevents the FET's base from becoming forward biased when the FET is on, at which time diode 38 prevents positive voltage from being applied to the FET's base.

The relay circuit has two main adjustments, one being the balancing rheostat 66 whose slider 67 is set so as to equalize the voltages at the emitter of transistors 40 and 50 when the voltages at terminals 24 and 25 are equal. This is necessitated due to the fact that the amplifiers including said resistances, and associated circuitry, cannot, in practice, be alike due to tolerances of actual parts.

The other adjustment is of the deadband, i.e., absolute difference in voltage between terminals 24 and 25 needed to fire diode 57. Diode 57, of course, fires at its rated voltage. The amplification of the amplifiers of relay A is adjusted by resistance 58 to such value that the said absolute difference in voltage is amplified just enough that voltage at the junction of diodes 55 and 56, less the base voltage of transistor 59, is enough to fire the diode 57.

Accordingly, whenever the voltage at one of terminals 24 and 25 is enough greater than the other, FET 19 will conduct, but when said voltage is not enough, i.e., is within the deadband of the relay B, FET will effectively restore resistance 35 to the reset circuitry.

The input impedance of relay B is, of course, high enough not to affect the voltages applied to its terminals, and filters (not shown) like those provided by 45, 55 and capacitors 44, 54, may by-pass transients from inputs to terminals 1 and 2 of relay A.

It will be seen that the relay B of FIGURE 4 is essentially a differential amplifier with an adjustable deadband. In terms of FIGURE 4, the deadband would be set for a voltage representing half the distance between limits $l$, since whether the process variable goes below the lower limit $l$ or above the upper limit $l$, the relay responds to each such event by turning FET 19 on. It is to be observed that the modification of the reset circuit shown in FIGURE 4, and the circuit itself, as well as the rate and proportioning circuitry, can vary widely. Moreover, the proportioning, rate and reset actions need not all be used, nor need it necessarily be the reset circuitry that is controlled by the relay B. Again, a second relay B set for a deadband exceeding that illustrated but still with the saturation limits L could be provided, together with suitable means for modifying the controller circuitry. This would provide a third unsaturated mode. Other extensions of the principles disclosed will be obvious to one skilled in the art.

Relay A conveniently may be a differential amplifier resembling the relay B of FIGURE 4. However, it would be of the more usual type having, in addition to an adjustable deadband, a pair of distinguishable on-states, corresponding to up-down, close-open, lower-raise, or the like, in view of the nature of the control action of valve as disclosed. Again, some processes are subject to one-sided control, so to speak, i.e., control energy (e.g., electrical heating current) is provided the process when the process variable demands it, or is simply turned off if there is no demand. In other words, the controller controls on but one side of the set point S. In such situations, control action in the nature of proportioning, reset and/or rate are obtainable in known fashion by suitable input and feedback elements, i.e., that is, an unsaturated mode of control is obtained, and there may be need for several modes thereof.

FIGURE 5 illustrates a modification providing asymmetrical modes of unsaturated control. The modification consists essentially of breaking the connection at the place marked with an X in FIGURE 4 and adding certain parts to the relay B and to the input impedance Z. The added parts correspond, part for part, to certain parts shown in FIGURE 4 and are represented by the corresponding reference numerals primed, in FIGURE 5. Thus, a second FET, denoted by the reference numeral 19′, and a second variable resistance 68′, are provided corresponding, respectively, to FET 19 and resistance 68 of FIGURE 4, and like them, connected in series across resistance 35 (which is not duplicated). Again, transistors 63', 65', Zener diode 57' and associated parts corresponding to transistors 63, 65, Zener diode 57, et al., are also provided. Certain of the existing parts of FIGURE 4 are included in FIGURE 5 to illustrate the precise manner of connecting the added parts to the basic circuit.

Resistors 68 and 68' can be adjusted to differing values, and it will be evident that which of these resistances is in the input impedance depends on which, if either, FET is on, which in turn depends on which of the limits $l$ is exceeded, namely, whether the process variable drops to the region between the lower limits $l$ and L, or increases to the region between the higher limits $l$ and L.

In this modification, it is desirable to connect the collectors of transistors 41 and 51 to the remainder of the circuitry by buffer amplifiers (exemplified by the box 69 in the case of transistor 41, FIGURE 5), to isolate the adjusting effect gotten by setting slider 67 from the adjusting effect gotten by varying resistance 58. The buffer amplifier would be, in such case, a simple 1:1 emitter follower transistor amplifier, or the like.

The buffer amplifier also may provide a means for setting the limits $l$ independently of each other, providing therefor for setting one limit $l$ at a distance from set point S that differs from the distance of the other limit $l$ therefrom. For example, the buffer amplifier 69 could add an adjustable voltage bias (positive or negative) to the base voltage of transistor 40 and be adjustable to provide a gain of other than unity (greater or lesser), thereby changing the voltage at terminal 25 that would be required to fire diode 57', without, however, affecting the voltage needed at terminal 24 to fire the diode 57.

Similarly, the base voltage of transistor 50 could be treated in the same way, either in addition to or instead of that of transistor 40. The foregoing description will enable one skilled in the art to make and use my invention, and various modifications thereof will be obvious to one skilled in the art that fall within the scope of the invention is set forth in the claims. For instance, the solid state version of relay B, and FET 19, are, functionally speaking, switches, and hence may be replaced by structurally different entities having the same functions.

I claim:

1. In a process variable control system including
   (a) set point means for providing a signal whose magnitude represents the desired value of said process variable,
   (b) measuring means for providing a signal whose magnitude represents the actual value of said process variable,
   (c) a controller responsive to the first two said signals to provide a control signal representing a continuous, linear, integro-differential function of deviation between the magnitudes of said first two said signals, and
   (d) control-effecting means responsive to said control signal to reduce said deviation to a predetermined value by exerting control-effect proportional to said control signal on said process variable such as to oppose deviation of said actual value from said desired value;
   the improvement comprising,
   (e) relay means responsive to said first two said signals to produce one output signal when said deviation is within first given limits and greater than said predetermined value, but to produce a second output signal instead of said one output signal, when said deviation is without said first given limits but within second given limits,
   (f) said second given limits corresponding to such range of said control signal as said control-effecting means can respond to without becoming saturated;
   (g) said controller including means capable of providing first and second modes of said control signal, said first mode being in accordance with a form of said function suited for reducing deviation within said first given limits, and said second mode being in accordance with a form of said function suited for reducing deviation without said first given limits yet within said second given limits;
   (h) the last said means being responsive to said one output signal to provide said first mode, and being responsive to said second output signal to provide said second mode.

2. The invention of claim 1, wherein said last said means includes
   (a) input impedance means for applying the second said signal to said controller for response of the latter thereto by causing said control signal to vary in accordance with the magnitude of said second said signal,
   and wherein said last said means also includes
   (b) feedback impedance means responsive to said control signal for providing a negative feedback signal modifying said second said signal in accordance with said control signal;
   (c) one of said impedance means being operable in response to the said output signals for causing said controller to provide said control signal in one or the other of the said modes depending on which said output signal is produced by said relay means.

3. The invention of claim 2, wherein the last said impedance means is the said input impedance means.

4. The invention of claim 2, wherein the last said impedance means includes electrical impedances, one of said electrical impedances being arranged to shunt another of said electrical impedances, the first said electrical impedance being responsive to said relay means to have a high value for one output signal of said relay means, but to have a low value for the other output signal of said relay means.

5. The invention of claim 4, wherein said electrical impedances are selected as to value and so arranged as to provide slow reset action when said one of said impedances has one of its said values, and fast reset action when said one of said impedances has the other of its said values.

6. The invention of claim 5, wherein said electrical impedances provide said input impedance means.

7. The invention of claim 1, wherein said relay means is a differential amplifier having a deadband corresponding to one of said limits, and being absolute value sensitive.

8. In a process variable control system having
   (a) a control device and a controller, said control device being operated by said controller in accordance with both an error signal applied to said controller and a first mode of continuous, linear, integro-differential control determined by said controller, and wherein
   (b) said error signal represents magnitude of deviation of said process variable from a set point, and said control device operates to reduce said deviation to a predetermined value in accordance with said mode only so long as said deviation does not attain a first given magnitude,
   the improvement comprising
   (c) a relay to which said error signal is applied, said relay having an output signal the level of which corresponds to the magnitude of said error signal,
   (d) said controller being responsive to said output signal at a given level thereof to modify said first mode to a second, different mode of continuous, linear, integro-differential control,
   (e) said relay providing said output signal at said given level only when said error signal corresponds to said deviation in a range from said first given magnitude to a second given magnitude less than said first given magnitude; said controller maintaining said first mode wherein said error signal corresponds to said deviation in a range from said predetermined value to said second given magnitude, said predetermined value being less than said second given magnitude.

9. The invention of claim 8, wherein said error signal is the difference between a second signal and a third signal, and said relay is a differential amplifier having a deadband corresponding to said second given magnitude.

10. The invention of claim 9, wherein said relay includes a pair of amplifiers, one having an output responsive to said second signal, and the other having an output responsive to said third signal; said relay also including means responsive to said outputs to produce the same output signal in accordance with that one of said second and third signals having the larger absolute value, the last said output signal being at said given level.

References Cited

UNITED STATES PATENTS

| | | | |
|---|---|---|---|
| 2,590,528 | 3/1952 | Gilbert | 328—146 X |
| 2,757,283 | 7/1956 | Ingerson et al. | 328—147 |
| 3,204,196 | 8/1965 | Rhyne | 328—148 X |
| 3,316,404 | 4/1967 | Cruse | 328—146 X |
| 3,316,423 | 4/1967 | Hull | 328—148 X |
| 3,252,101 | 5/1966 | Gorbatenko | 328—132 |

JOHN S. HEYMAN, Primary Examiner

R. C. WOODBRIDGE, Assistant Examiner

U.S. Cl. X.R.

307—304; 318—18; 328—1, 132, 150